(12) United States Patent
Kawano et al.

(10) Patent No.: US 7,335,439 B2
(45) Date of Patent: Feb. 26, 2008

(54) HERMETICALLY SEALED BATTERY

(75) Inventors: Katsuya Kawano, Takasaki (JP);
Motoo Tadokoro, Itano-Gun (JP);
Fumiyoshi Yoshinari, Tokushima (JP)

(73) Assignee: Sanyo Electric Co. Ltd., Osaka (JP)

( * ) Notice: Subject to any disclaimer, the term of this patent is extended or adjusted under 35 U.S.C. 154(b) by 714 days.

(21) Appl. No.: 10/792,908

(22) Filed: Mar. 5, 2004

(65) Prior Publication Data

US 2004/0234842 A1 Nov. 25, 2004

(30) Foreign Application Priority Data

Mar. 7, 2003 (JP) .............................. 2003-061164

(51) Int. Cl.
*H01M 2/12* (2006.01)
*H01M 10/50* (2006.01)
*H01M 2/08* (2006.01)

(52) U.S. Cl. ........................... 429/56; 429/62; 429/174

(58) Field of Classification Search ..................... None
See application file for complete search history.

(56) References Cited

U.S. PATENT DOCUMENTS 4,971,867 A * 11/1990 Watanabe et al. ............. 429/61
5,876,868 A * 3/1999 Tanida ......................... 429/56

FOREIGN PATENT DOCUMENTS

| JP | 02-207450 | 8/1990 |
|---|---|---|
| JP | 05-151944 | 6/1993 |
| JP | 5151944 | 6/1993 |

OTHER PUBLICATIONS

Office Action dated Feb. 10, 2006 issued in corresponding Chinese Application No. 20410007749.5.

* cited by examiner

*Primary Examiner*—Patrick Joseph Ryan
*Assistant Examiner*—Julian Mercado
(74) *Attorney, Agent, or Firm*—Westerman, Hattori, Daniels & Adrian, LLP.

(57) ABSTRACT

A hermetically sealed battery is provided, equipped with an opening sealing unit 10 including a Positive Temperature Coefficient (PTC) element without reducing the volume of the outside can, and capable of preventing the generation of a large current in case a short circuit occurs as well as enhancing operational security. The opening sealing unit 10 according to the invention comprises a bottom plate 11 for closing the opening of the outside can 18, a positive electrode cap 12 forming a space for storing a pressure valve, said positive electrode cap being used as a terminal for the positive electrode, a resilient valve 14 having a steel plate 14a on the upper surface, a spring 15 and a PTC element ring 16 disposed on the flange 12a in the positive electrode cap 12. An insulation gasket 17 is mounted onto the periphery of the opening sealing unit 10 to hermetically close the opening of the outside can 18.

9 Claims, 2 Drawing Sheets

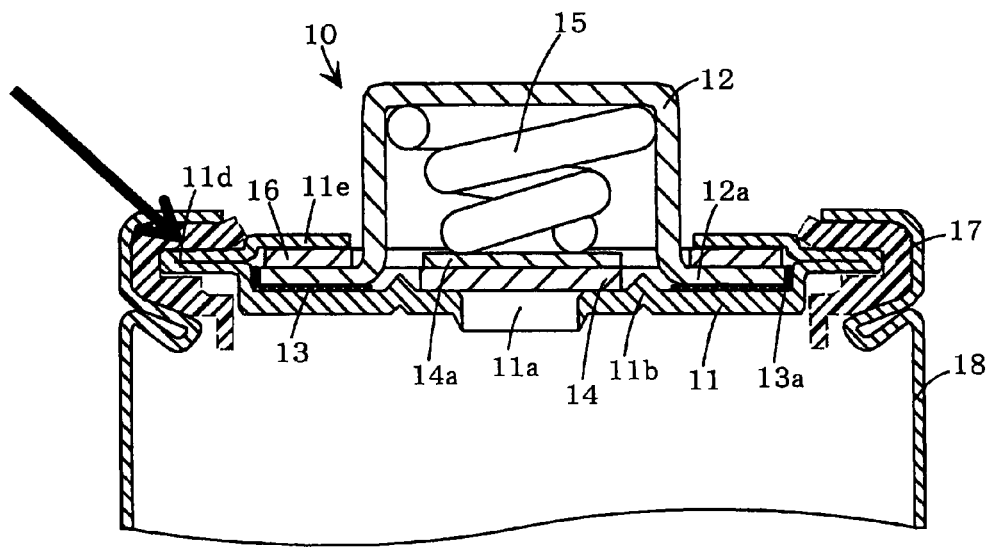
FIG 1 PRESENT INVENTION
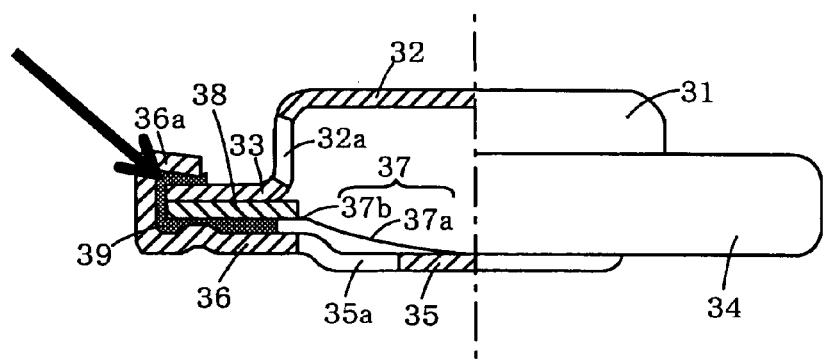
FIG 2 CITED REFERENCE

HERMETICALLY SEALED BATTERY

BACKGROUND OF THE INVENTION

1. Field of the Invention

The present invention relates to a hermetically sealed battery which is equipped with an electrode group, wherein a positive electrode and negative electrode are disposed in such a way that they are wound and separated from each other by a separator, an outside can for storing the electrode group with an opening used as a terminal for one of the positive and negative electrodes, and an opening to serve as a sealing unit with a pressure valve, the sealing unit functioning as a terminal for the other electrode to close the opening of the outside can hermetically by means of an insulation gasket. More specifically, the present invention relates to a hermetically sealed battery, which includes a Positive Temperature Coefficient (PTC) element in a opening sealing unit.

2. Description of the Related Art

Generally, a hermetically sealed battery, such as a nickel-hydrogen battery, or a nickel-cadmium battery or the like, is operated at an applied voltage of about 1.2 V in the discharge mode. As a result, a battery of the so-called AA or AAA size can be used as a compatible battery for an AA or AAA size manganese dry cell or alkali primary battery (alkali dry cell). When a manganese dry cell or alkali dry cell is used in an erroneous manner, e.g., when the external circuit on the load side is short circuited or when the battery is inversely mounted in an inverse orientation, a large output current does not flow because of inferior output property. However, such a hermetically sealed battery as described above provides a large current even when a short circuit occurs, because the battery is capable of supplying a large discharge current, and consequently a burnout often takes place due to overheating and/or heavy current flow.

To prevent the occurrence of such burnout due to overheating and/or heavy current flow, a lithium ion battery normally includes either a PTC element for suppressing the flow of a large current with an increased resistance resulting from the increase in temperature, or a breaker for interrupting such flow. For instance, Japanese Patent Laid-Open Publication No. H02(1990)-207450 has proposed that the PTC element be disposed on the bottom of the outside can, where the bottom is used as a terminal for the positive electrode. However, if the PTC element is mounted upon a location other than the opening sealing unit, the accuracy of monitoring the temperature inside the valve chamber is reduced. In view thereof, Japanese Patent Publication No. 3143176 has proposed that the PTC element be disposed in an opening close unit having a valve body.

The structure of such a opening sealing unit having a PTC element is shown in FIG. 3. The opening sealing unit comprises a stainless steel positive electrode cap 31 made in the shape of a cap and a bottom plate 34 made in the shape of a dish. The positive electrode cap 31 is comprised of a convex portion 32 swelling outwardly from the battery and a flange portion 33 forming the bottom of the convex portion 32 in the shape of a flat plate, wherein there is a plurality of gas discharging holes 32a at the corners of the convex portion 32. On the other hand, the bottom plate 34 has a concave portion 35 swelling inwardly towards the battery and a flange portion 36 forming the bottom of the concave portion 35 in the form of a flat plate, wherein there is a plurality of gas discharging holes 35a at the corners of the concave portion 35.

An electric power guiding plate 37 capable of deforming at a gas pressure greater than a predetermined value inside the battery is made to reside at the space between the positive electrode cap 31 and bottom plate 34. The electric power guiding plate 37 consists of a concave portion 37a and a flange portion 37b, both made of aluminum foil. The concave portion 37a is disposed in such manner that the lowest part thereof is in contact with the upper surface of the concave portion 35 at the bottom plate 34. The flange portion 37b is clamped between the flange portion 33 of the positive electrode cap 31 and the flange portion 36 at the bottom plate 34. In this case, the positive electrode cap 31 and the bottom plate 34 are sealed liquid tight by means of a polypropylene (PP) insulation gasket 39 for the opening sealing unit.

Meanwhile, a PTC (Positive Temperature Coefficient) element 38 is disposed on the upper part of the flange portion 37b. When an overcurrent flows in the battery, abnormal heat is generated, increasing the resistance of the PTC element 38, which in turn causes such overcurrent to be suppressed. Furthermore, when the increase of gas pressure inside the battery is greater than a predetermined value, the concave portion 37a of the electric power guiding plate 37 is deformed, causing the electric power guiding plate 37 and the concave portion 35 of the bottom plate 34 to lose contact with each other, thereby allowing the overcurrent or the short circuit current to be interrupted.

However, as shown in FIG. 4, in the case of an alkali secondary battery using a opening sealing unit without a PTC element, the opening sealing unit 40 is designed in such a way that the thickness at the outer periphery (the part caulked to an outside can 47 by an insulation gasket 46) is reduced, allowing for an increase in the volume of the battery, thereby increasing the capacity of electric charge to be discharged. That is, the opening sealing unit 40 consists of a cap-shaped positive electrode cap 41 and a disk-shaped bottom plate 42 both made of nickel-plated steel plates welded to each other.

Thereafter, a gas discharging opening 42a is constituted at the center of the bottom plate 42, and a flange portion 42b is formed at the outer periphery of the bottom plate 42. A pressure valve consisting of a valve plate 43 and a spring 45 is disposed at the space between the positive electrode cap 41 and the bottom plate 42. In this case, a nickel-plated steel plate 44 is interposed between the valve plate 43 and the spring 45. Moreover, the flange portion 42b of the bottom plate 42 is clamped by a polypropylene (PP) insulation gasket 46, which is caulked to and rests upon a deep-drawn portion 47a constituted on the upper part of the outside can 47.

However, as shown in FIG. 3, a laminate structure consisting of the flange portion 36, the insulation gasket 39, the PTC element 38 in the bottom plate 34, the flange portion 33 in the positive electrode cap 31, and the caulked portion 36a in the bottom plate 34 is formed when the opening sealing unit is equipped with the PTC element. In this manner, the outer periphery of the opening sealing unit (the portion caulked to the outside can through the insulation gasket) becomes thick in consistency, thereby reducing the space for storing the electrode group and thus it must be equipped with a PTC element at the expense of the charge capacity of the battery.

As distinguished from the lithium battery, the alkali secondary battery is equipped with a non-fracture type resilient valve for discharging gas. Therefore, when a functional component such as the PTC element is disposed inside the opening sealing unit, alkali mist normally discharged in very small amounts causes the PTC element to deteriorate, thereby making it difficult to mount the PTC element upon the opening sealing unit in a unified form.

SUMMARY OF THE INVENTION

The present invention aims to address the above-described problems in the prior art, by providing for a hermetically sealed battery in which an opening sealing unit is suitably equipped with a PTC element for the alkali secondary battery without providing any reduction in the volume of the outside can, to prevent the generation of a large current in case a short circuit occurs, thereby greatly enhancing operational security.

To attain this objective, the opening sealing unit used in the hermetically sealed battery according to the invention is equipped with a cap portion in which a flange is formed along with a valve chamber for storing a pressure valve, and a bottom plate for closing the opening of an outside-can. Moreover, the opening sealing unit according to the invention is characterized in such manner that an annular PTC element is disposed on the upper surface of the flange in the cap portion (which upper surface tends to be located outside the valve chamber when the cap portion is mounted), and the PTC element is affixed, or preferably caulked to the upper surface of the flange in the cap portion by a folded portion, which is formed at the periphery of the bottom plate.

When the annular PTC element is disposed on the upper surface of the flange in the cap portion as described above, the PTC element can be separately disposed outside of the valve chamber. In this manner, the electrolyte is prevented from depositing onto the PTC element, thereby making it possible to suppress the deterioration of the latter. Moreover, the PTC element is disposed adjacent to the valve chamber, thus allowing the temperature inside the valve chamber to be monitored with higher accuracy.

Furthermore, when the PTC element is caulked to the upper surface of the flange in the cap portion by a folded portion formed at the periphery of the bottom plate, it would not be necessary to situate the PTC element in the outermost part of the bottom plate, and therefore the thickness of the caulked portion can be reduced in the case where the opening sealing unit is mounted upon the opening of the outside can. This therefore allows the opening sealing unit including the PTC element to be mounted upon the opening of the outside can without reducing the volume of the outside can. Hence, it can be stated that the present invention offers a hermetically sealed battery, which is capable of suppressing the generation of a large current in the event of a short circuit and enhancing operational security.

Further still, when the flange portion is formed at the outermost area of the folded portion and clamped by an insulation gasket, the thickness of the peripheral part of the opening sealing unit can also be reduced. In conjunction with this, when the thinning process is applied to the folded portion, the thickness of the flange portion clamped by the insulation gasket can be further reduced. In this case, it is desirable that the PTC element has such characteristic where a current of 3 A or less can be interrupted at normal temperature and a current of 1 A or less can be interrupted at 60° C. In addition, it is desirable that the PTC element also has the characteristic of withstanding pressure such that the battery can be charged and discharged with a 5 A current more than 1000 times at an applied voltage of 15 V. Further still, it is desirable that the PTC element provide a micro leakage current of 0.5 A or less after interrupting the operational current.

Regarding the interruption of current, it is necessary to set the cut-off current at 3 A or less in order to prevent the generation of abnormal heating in the battery and/or the external circuit connected thereto when a short circuit takes place. With respect to the capacity of the PTC element to withstand pressure, it is assumed that a normally used battery is subjected to a repetition of more than 1000 cycles of charging/discharging current of 5 A at an output voltage of 15 V, and has to withstand such a severe operation. Then, the micro leakage current should be set at 0.5 A or less in order that it may not provide a large load to the battery and/or the external circuit during a short circuit, even after a large operational current is already interrupted by the action of the PTC element. Moreover, when a protection layer made of olefin resin is deposited onto the inner peripheral end surface of the PTC element, the PTC element can be protected against deterioration resulting from adhesion of the electrolyte, even if the electrolyte adheres to the inside peripheral end surface of the PTC element.

BRIEF DESCRIPTION OF THE DRAWINGS

FIG. 1 is a partial sectional view of a hermetically sealed battery in which an opening sealing unit according to the invention is mounted on the opening of an outside can;

FIG. 2 is a dissected view of the opening sealing unit shown in FIG. 1;

DESCRIPTION OF THE PREFERRED EMBODIMENTS

Figure 3:
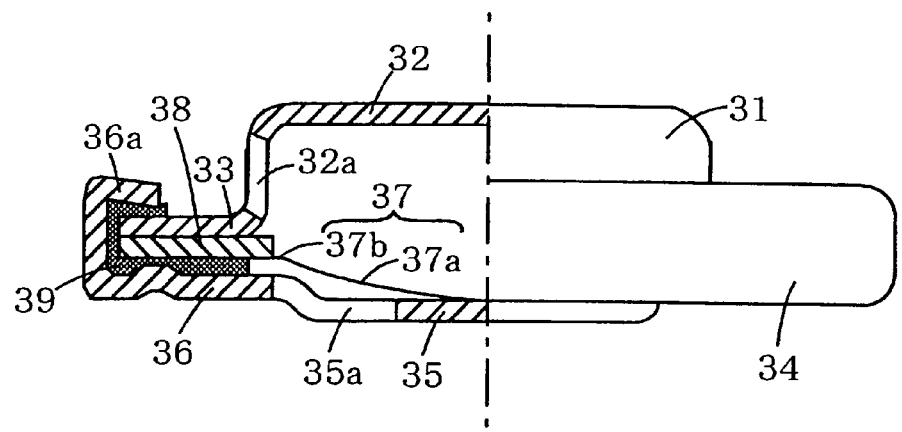
FIG. 3 is a sectional view of an opening sealing unit including a PTC element in the prior art.

A preferred embodiment of the present invention as applied to a nickel-hydrogen battery is hereafter described in relation to FIGS. 1 and 2. FIG. 1 is a partial sectional view of a hermetically sealed battery in which an opening sealing unit is mounted on the opening of an outside can, and FIG. 2 is a dissected view of the opening sealing unit shown in FIG. 1.

1. Opening Sealing Unit

As shown in FIGS. 1 and 2, the opening sealing unit 10 according to the invention comprises a bottom plate 11 for closing the opening of an outside can 18; a positive electrode cap 12 serving as a terminal for a positive electrode and forming a space (valve chamber) for storing a pressure valve; an insulation ring 13; a resilient valve 14 having a nickel-plated steel plate 14a on the upper surface thereof; a spring 15; and a PTC element ring 16 disposed upon a flange 12a of the positive electrode cap 12. In this case, an insulation gasket 17 is mounted onto the periphery of the opening sealing unit 10 so as to close the opening of the outside can 18.

The bottom plate 11 is in the shape of a dish made from a nickel-plated steel plate. A gas discharge hole 11a is created in the center of the dish, and four positioning projections 11b for affixing the resilient valve 14 at a predetermined position are disposed around the gas discharge hole 11a. In this case, deionization (DI) processing is applied to a peripheral part 11c at the dish-shaped end of the bottom plate 11, and the thickness thereof is reduced to half of the thickness of the dish-shaped part of the bottom plate 11, and a fold portion 11d is constituted by folding the thinner part of the bottom plate 11 to which DI processing is applied at a position of about one third of the length thereof. Moreover, caulking portions 11e for caulking the PTC element ring 16 to the upper surface of the flange 12a in the positive electrode cap 12 are constituted on the inside circumference of the fold portion 11d.

The positive electrode cap 12 is made from a nickel-plated steel plate, and swelled to the shape of a cap at the center. Moreover, the flange 12a is constituted on the peripheral part, i.e., the bottom part of the positive electrode cap 12. In this case, the flange 12a of the positive electrode cap 12 is designed in such manner that its diameter is somewhat smaller than the diagonal distance between the dish-shaped end portions of the bottom plate 11. Furthermore, gas discharge holes (not shown) are formed on the sidewall of the positive electrode cap 12.

The isolation ring 13 is formed in the shape of a ring from polypropylene (PP), with a diameter corresponding to such diameter formed when it is interposed diagonally between the dish-shaped end portions of the bottom plate 11. Moreover, the isolation ring 13 has an opening whose diameter is slightly larger than that of a circle formed by the four positioning projections 11b in the bottom plate 11. In addition, a standing end portion 13a is formed at the peripheral end of the isolation ring 13, so that the flange portion 12 is prevented from coming into contact with the fold portion 11d constituted at the bottom plate 11, even if the flange 12a residing at the peripheral part of the positive electrode cap 12 is mounted onto the isolation ring 13. As a result, when the PTC element ring 16 is disposed upon the flange portion 12 of the positive electrode cap 12 in a later step, a discharge current flows to the positive electrode cap 12 through the fold portion 11d constituted at the bottom plate 11, the caulking portion 11e, the PTC element ring 16 and the flange 12a.

The resilient valve 14 is produced from ethylene-propylene gum (EPDM), and is disposed in such manner that it closes the gas discharge hole 11a located at the dish-shaped center portion of the bottom plate 11. A nickel-plated steel plate 14a is made to reside on the upper surface of the resilient valve 14, and a spring 15 for biasing a press force to the nickel-plated steel plate 14a is further disposed on the nickel-plated steel plate 14a. As a result, when the inner space of the battery is subjected to pressure greater than a predetermined value, the resilient valve 14 rises against the press force resulting from the spring 15, so that gas is discharged from the gas discharge hole (not shown) in the positive electrode cap 12, thereby making it possible for the pressure in the inner space of the battery to decrease.

The PTC element ring 16 is made from an electrically conductive polymer having a positive temperature characteristic as a Positive Temperature Coefficient (PTC) element, currently manufactured and sold on the market under the trademark "Polyswitch" by Raychem Corporation. The resistance of the PTC element ring 16 increases as the temperature increases, and has an electrical characteristic in that a current of 3 A or less can be interrupted at normal temperature and a current of 1 A or less can be interrupted at 60° C. as well as the character to withstand pressure such that the charging and discharging of 5 A current can be repeatedly carried out more than 1000 times at an applied voltage of 15 V. Moreover, the PTC element ring 16 exhibits an extremely small leakage current of 0.5 A or less after the operational current is interrupted. In addition, since the inside wall surface of the PTC element ring 16 is covered by an olefin resin coating, deterioration thereof due to the deposition thereon of alkali mist or the like can be prevented.

In this case, an opening whose diameter is somewhat greater than that of the swelled portion of the positive electrode cap 12 is constituted at the center of the PTC element ring 16, and made to reside on the upper surface of the flange 12a in the positive electrode cap 12. Accordingly, the discharge current flows into the positive electrode cap 12 through the fold portion 11d constituted in the bottom plate 11, the caulking portion 11e, the PTC element ring 16 and the flange 12a. The PTC element ring 16 is designed in such manner that the range of operational current is 3 A or less at normal temperature (25° C.) and 1 A or less at high temperature (60° C.).

2. Mounting of Opening Sealing Unit

The method of mounting the opening sealing unit 10 onto the outside can 18 is described hereafter. Firstly, a bottom plate 11 is provided, wherein a gas discharge hole 11a is constituted at the center of the dish-shaped part thereof, and four positioning projections 11b are created around the gas discharge hole 11a. Then, DI processing is applied to the bottom plate 11 in the vicinity of the peripheral portion 11c at the end portion of the dish-shaped part thereof to reduce its thickness by half. Thereafter, the fold portion 11d is made by bending the DI processed portion to an L shape such that the opening sealing unit has a predetermined diameter (see broken lines in FIG. 2).

Subsequently, the insulation ring 13 in which a projecting end part 13a is formed at the peripheral end thereof is mounted onto the dish-shaped part of the bottom plate 11, and then the resilient valve 14 is arranged in such a way that it closes the gas discharge hole 11a constituted at the center of the dish-shaped part of the bottom plate 11. Thereafter, the spring 15 is mounted on the nickel-plated steel plate 14a, which is disposed on the upper surface of the resilient valve 14, and then the flange 12a of the positive electrode cap 12 is placed over the isolation ring 13. Subsequently, the PTC element ring 16 is mounted onto the flange 12a, and then the fold portion 11d is constituted by folding the bending portion 11c inward at the bottom plate 11.

Thereafter, a caulked portion 11e is formed by caulking the tip of the bending portion 11c toward the flange 12a in the positive electrode cap 12, and then the PTC element ring 16 is affixed to the upper surface of the flange 12a in the positive electrode cap 12. Thereby, the resilient valve 14 is biased by the spring 15, receiving a press force to close the gas discharge hole 11a, and the opening sealing unit 10 is thus formed.

3. Production of Nickel-Hydrogen Battery

The method of producing a nickel-hydrogen battery with an opening sealing unit 10 as described above is hereafter explained. Firstly, a nickel-sintered porous element is constituted on the surface of an electrode core body made of punching metal, and then filled with an active material including nickel hydroxide as a main component through the chemical impregnation method, to form a nickel positive electrode plate. Meanwhile, the electrode core body made of foamed nickel is filled on the surface with a paste-like active negative electrode material consisting of a hydrogen storage alloy, and then dried. Thereafter, the electrode core body is rolled by a predetermined thickness to produce a hydrogen storage alloy negative electrode plate.

A separator is interposed between the nickel positive electrode plate and the hydrogen storage alloy negative electrode plate, and a helical electrode group is formed by helically winding both electrode plates. On the upper end surface of the helical electrode group, the end portion of the electrode core body in the nickel positive electrode plate is exposed, and on the lower end surface of the hydrogen storage alloy negative electrode plate, the end portion of the electrode core body is also exposed. The core body exposed on the upper end surface of the helical electrode group is welded to a positive electrode collector, while the core body exposed on the lower end surface thereof is welded to a negative electrode collector. Meanwhile, a positive electrode lead wire extending from the end of the positive electrode collector is provided, and the end thereof is inserted into the insulation gasket and then welded to the lower end surface of the opening close unit.

In the next step, the helical electrode group is inserted into the outside can 18 which is produced from a nickel-plated iron sheet in the form of a tubular case having a bottom (the outer surface of the bottom to be used as an external terminal for the negative electrode). Thereafter, the negative electrode collector is spot-welded to the inside surface of the bottom of the outside can 18, and then a groove 18a is constituted on the upper peripheral surface thereof. Further, the positive electrode lead wire extending from the positive electrode collector is bent at right angles, and then the end of the positive electrode lead wire is resistance-welded to the bottom plate 11 of the opening sealing unit 10. Thereafter, the outside can 18 is filled with an alkali electrolyte of 30 wt % potassium hydroxide (KOH) aqueous solution.

In the next step, the polypropylene (PP) insulation gasket 17 is mounted onto the fold portion 11d of the bottom plate 11 which serves as a flange portion for the opening sealing unit 10, and then the opening sealing unit 10 is mounted onto the opening of the outside can 18, after the positive electrode lead wire is bent. Thereafter, the edge portion 18b for the opening of the outside can 18 is bent inward to hermetically close the opening. A nickel-hydrogen battery having a nominal capacity of 1.7 Ah is thus made.

4. Short Circuit Test

Figure 4:
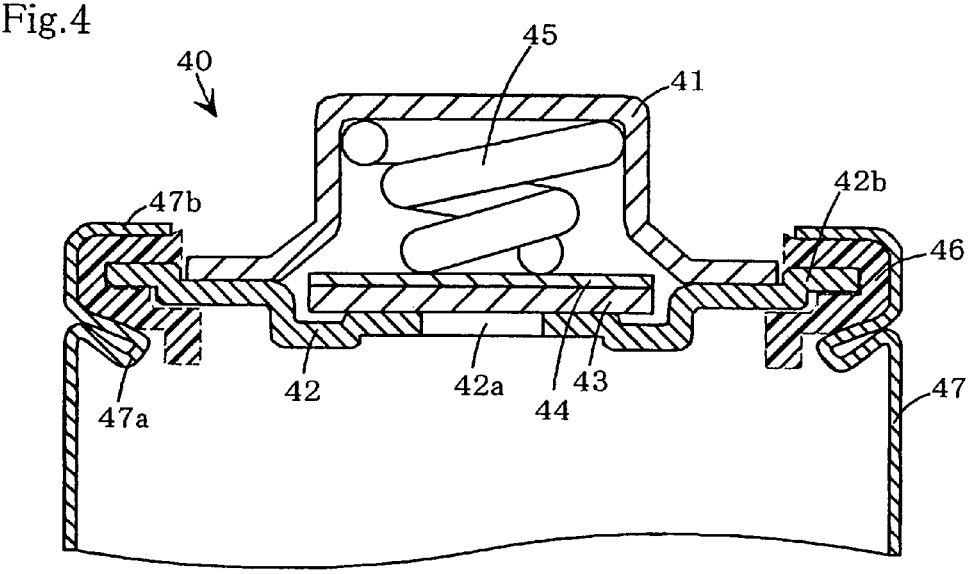
FIG. 4 is a sectional view of an opening sealing unit without the PTC element in the prior art.

In the short circuit test carried out using two separate nickel-hydrogen batteries prepared in accordance with the above procedure and two separate conventional nickel-hydrogen batteries (with a nominal capacity of 1.7 Ah) having no PTC element as shown in FIG. 4, each positive electrode was connected to each negative electrode via a conductor, so that each battery was short circuited in an external circuit, and the maximum current in the short circuit and the maximum operational temperature of the battery were measured. The results obtained are listed in Table 1.

TABLE 1

| Battery Type | Max. Current (A) | | Max. Temperature (° C.) | | Status of Battery |
|---|---|---|---|---|---|
| | No. 1 | No. 2 | No. 1 | No. 2 | |
| Invention | 6.5 | 6.8 | 68 | 70 | Small Heating Value |
| Conventional | 22.0 | 26.5 | 141 | 165 | Large Heating Value |

As may be gleaned from the results obtained, the batteries according to the invention yielded lower values of the maximum operational current and heating states, whereas the conventional batteries yielded relatively larger values with respect to both states. The differences lie in the fact that in the case of the batteries constructed according to the invention, the structural arrangement of the PTC element ring 16 being mounted on the flange 12a of the positive electrode cap 12 permits the short circuit current to flow in the following sequence: the positive electrode cap 12→the PTC element ring 16→the caulking portion 11e in the bottom plate 11→the fold portion 11d→the dish-shaped part of the bottom plate 11→the positive electrode in the electrode group→the negative electrode→the outside can 18. As a result, the resistance of the PTC element ring 16 increases, thereby suppressing the short circuit current, and consequently, reducing the operational temperature of the battery.

As described above, in accordance with the present invention, the PTC element ring 16 is mounted on the upper surface of the flange 12a in the positive electrode cap 12, thereby enabling it to be isolated, being disposed outside of the valve chamber 12. As a result, deterioration of the PTC element ring 16 may be avoided because the electrolyte is prevented from depositing on the PTC element ring 16. In addition, the PTC element ring 16 may be disposed adjacent to the valve chamber 12, thereby making it possible to monitor the temperature therein with higher accuracy.

The PTC element ring 16 may be affixed to the upper surface of the flange 12a in the positive electrode cap 12 by means of the caulked portion 11e, which is constituted at the peripheral part of the bottom plate 11. In this manner, it would not be necessary to dispose the PTC element ring 16 onto the outermost part of the periphery of the bottom plate 11. Accordingly, the thickness of the caulked portion 11e can be reduced in the case where the opening sealing unit 10 is mounted onto the opening of the outside can 18. This would allow the opening sealing unit 10 including the PTC element ring 16 to be mounted onto the opening of the outside can 18 without reducing the volume of the latter. Accordingly, the present invention offers a hermetically sealed battery capable of preventing the generation of a large current in case a short circuit occurs as well as enhancing operational security.

While the preferred embodiments of the present invention described above have been exclusively applied to nickel-hydrogen batteries, it is obvious that the invention may also be applied to other types of hermetically sealed batteries, such as nickel cadmium batteries, lithium ion batteries or the like.

What is claimed is:

1. A hermetically sealed battery comprising: an electrode group in which a positive electrode and a negative electrode are wound via a separator; an outside can having an opening for storing said electrode group, said opening being used as a terminal for one of the said electrodes; and an opening sealing unit including a pressure valve for hermetically closing the opening of said outside can by means of an insulation gasket, the said opening sealing unit being used as a terminal for the other electrode, wherein the said opening sealing unit is equipped with a valve chamber for storing said pressure valve, a cap portion in which a flange is constituted, and a bottom plate for closing said opening, wherein an annular Positive Temperature Coefficient (PTC) element is disposed on the upper surface of the flange of the said cap portion, and wherein said PTC element is fixed by a fold portion constituted at the peripheral area of the said bottom plate.

2. A hermetically sealed battery according to claim 1, wherein the said PTC element is caulked to the upper surface of the flange in the said cap portion by the fold portion constituted at the peripheral area of the said bottom plate.

3. A hermetically sealed battery according to claim 1, wherein the fold portion in the said bottom plate is formed at the outermost surrounding of the said fold portion, and wherein the insulation gasket referred to in claim 1 clamps the fold portion.

4. A hermetically sealed battery according to claim 1, wherein the said fold portion is subjected to a thickness reducing process.

5. A hermetically sealed battery according to claim 1, wherein the said PTC element has such a characteristic where a current of 3 A or less can be interrupted at normal temperature and a current of 1 A or less can be interrupted at 60° C.

6. A hermetically sealed battery according to claim 1, wherein the said PTC element also has the characteristic of withstanding pressure such that the charging and discharging of 5 A current can be repeatedly carried out more than 1000 times at an applied voltage of 15V.

7. A hermetically sealed battery according to claim 1, wherein the said PTC element provides a micro leakage current of 0.5 A or less, after interrupting the operational current.

8. A hermetically sealed battery according to claim 1, wherein a protection layer made from olefin resin is interposed on the inner peripheral end surface of the said PTC element.

9. A hermetically sealed battery according to claim 1, wherein said outside can and said opening close unit are similarly produced in the shape of a size AA or size AAA dry cell.

* * * * *